(12) United States Patent  (10) Patent No.: US 8,270,318 B1
Kumbhari  (45) Date of Patent: Sep. 18, 2012

(54) EFFICIENT SWITCH-TO-SWITCH LINK DISCOVERY

(75) Inventor: Uday Kishore Kumbhari, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 493 days.

(21) Appl. No.: 12/621,270

(22) Filed: Nov. 18, 2009

(51) Int. Cl.
*H04L 12/28* (2006.01)

(52) U.S. Cl. .................. 370/254; 370/400; 709/223

(58) Field of Classification Search .......... None
See application file for complete search history.

(56) References Cited

U.S. PATENT DOCUMENTS

| | | | |
|---|---|---|---|
| 6,697,338 B1 * | 2/2004 | Breitbart et al. | 370/254 |
| 7,035,266 B2 * | 4/2006 | Binder | 370/395.53 |
| 7,319,677 B2 * | 1/2008 | Quist et al. | 370/254 |

OTHER PUBLICATIONS

Lowekamp et al. "Topology Discovery for Large Ethernet Networks," SIGCOMM'01, Aug. 27-31, 2001, 12 pp.

* cited by examiner

*Primary Examiner* — Brian Roberts
(74) *Attorney, Agent, or Firm* — Shumaker & Sieffert, P.A.

(57) ABSTRACT

Techniques are described for discovering switch-to-switch links in a computer network. In general, the techniques recognize that a link exists between a first switch and a second switch when a MAC address is reachable by a first port of the first switch and by a first port of the second switch, two MAC addresses are reachable by a second port of the first switch, one of the two MAC addresses reachable by the second port of the first switch is also reachable by a second port of the second switch, and the other of the two MAC addresses is also reachable by a third port of the second switch. These techniques search for this occurrence by iteratively searching ports of two switches. That is, the techniques iterate over the ports, rather than MAC addresses thereof. In this manner, the techniques efficiently discover switch-to-switch links in a computer network.

22 Claims, 6 Drawing Sheets

EFFICIENT SWITCH-TO-SWITCH LINK DISCOVERY

TECHNICAL FIELD

This disclosure relates to computer networks and, more particularly, to physical network topology discovery.

BACKGROUND

A computer network includes a collection of interconnected computing devices that exchange data and share resources. The devices may include, for example, web servers, database servers, file servers, routers, printers, end-user computers and other devices. The variety of devices may execute a myriad of different services and communication protocols. Each of the different services and communication protocols exposes the network to different security vulnerabilities. The physical interconnection of computing devices in a network is referred to as the "network topology." Various situations exist in which discovery of the network topology by one or more of the computing devices of a network is useful or required.

For example, network management and performance analysis of layer two (L2) networks (e.g., large bridged-Ethernet networks) often require accurate topology information. This typically involves a management device identifying any connections between two L2 switches, i.e., so called switch-to-switch links, by interrogating (MAC) address forwarding tables within the devices. However, conventional techniques for discovering switch-to-switch links of a large L2 computer network often utilize significant computational resources. One conventional technique requires the management device to iterate over each media access control (MAC) address of each address forwarding table of each port of each L2 device within the network. In particular, the management device processes the MAC addresses to determine whether two other switches have at least three MAC addresses in common in their address forwarding tables (AFTs), determining which ports of each switch include three MAC addresses in common, and checking whether the three MAC addresses are found collectively on two ports of one switch and three ports of the other switch. When these criteria are met, the management device determines that a switch-to-switch link exists within the network. However, for n MAC addresses, the timing function for this technique is $O(n^3)$. That is, in the worst case, this technique requires approximately $n^3$ mathematical operations to determine a link between the two switches. This technique is thus highly CPU-intensive and highly time consuming. Further details of the technique are described in "Topology Discovery for Large Ethernet Networks" by Bruce Lowekamp, David R. O'Hallaron, Thomas R. Gross; SIGCOMM'01, Aug. 27-31, 2001, the entire contents of which are incorporated by reference.

SUMMARY

In general, this disclosure describes techniques for quickly discovering switch-to-switch links for determining a physical network topology. The techniques include identifying switch-to-switch links by iterating over ports of each switch, rather than exhaustively searching media access control (MAC) addresses stored in address forwarding tables (AFTs) of each switch. Typically the number of ports on a switch that are in use is much smaller than the number of MAC addresses stored in an AFT of a switch. Therefore, the techniques of this disclosure may result in a fewer number of elements through which to iterate in comparison with conventional techniques.

The techniques of this disclosure may also require fewer iterations than conventional switch-to-switch link discovery algorithms. The link discovery techniques of this disclosure include preparing a set of all MAC addresses of a first switch and a set of all MAC addresses of a second switch, constructing a set of all common MAC addresses from these two sets, removing the MAC addresses of the interfaces of the first and second switches from the common set, and checking whether the common set has at least three MAC addresses remaining.

Assuming at least three MAC addresses remain, the techniques then include preparing a first list of all ports on the first switch that collectively have the common set of MAC addresses in their AFTs, preparing a second list of all ports on the second switch that collectively have the common set of MAC addresses in their AFTs, checking whether the first list has at least two ports and the second list has at least three ports, or whether the first list has at least three ports and the second list has at least two ports, and choosing the switch with at least three ports as a right-hand-side (RHS) switch and the switch with at least two ports as the left-hand-side (LHS) switch.

The techniques then include identifying a link between a port of the RHS switch and a port of the LHS switch. In particular, the techniques include determining that a link exists between the LHS switch port and the RHS switch port for a port of the RHS switch whose AFT includes the common set of MAC addresses and a port of the LHS switch whose AFT also includes the common set of MAC addresses. Because the techniques of this disclosure focus primarily on ports, rather than MAC addresses, these techniques result in an algorithm whose timing function is $O(n^3)$, but where n represents the number of ports on a switch, as opposed to the timing function of the conventional algorithm, whose timing function is $O(m^3)$, where m represents the number of MAC addresses in a combination of AFTs of a switch. Thus, these techniques provide an algorithm for which the iterating factor is smaller than that of the conventional techniques. That is, the number of ports on a switch in the techniques of this disclosure is the iterating factor, as opposed to the number of MAC addresses that are reachable by the switch in the conventional techniques.

In one example, a method includes constructing, with a network device, a set of ports of a first network switch that collectively include media access control (MAC) addresses of a common set of MAC addresses between the first network switch and a second network switch, constructing, with the network device, a set of ports of the second network switch that collectively include the MAC addresses of the common set of MAC addresses, determining, with the network device, that a link exists between a first port of the set of ports of the first network switch and a first port of the set of ports of the second network switch when the first port of the set of ports of the first network switch includes a first MAC address and a second MAC address, a second port of the set of ports of the second network switch includes the first MAC address, a third port of the set of ports of the second network switch includes the second MAC address, and a second port of the set of ports of the first network switch includes a third MAC address that is also included in the first port of the set of ports of the second network switch, and, when the link is determined to exist, recording, with the network device, existence of the link between the first port of the set of ports of the first network switch and the first port of the set of ports of the second network switch in a computer-readable storage medium.

In another example, a device includes a computer-readable storage medium, a network interface configured to retrieve data from a first network switch and a second network switch, and a control unit configured to construct a set of ports of the first network switch that collectively include MAC addresses of a common set of MAC addresses between the first network switch and the second network switch, construct a set of ports of the second network switch that collectively include the MAC addresses of the common set of MAC addresses, determine that a link exists between a first port of the set of ports of the first network switch and a first port of the set of ports of the second network switch when the first port of the set of ports of the first network switch includes a first MAC address and a second MAC address, a second port of the set of ports of the second network switch includes the first MAC address, a third port of the set of ports of the second network switch includes the second MAC address, and a second port of the set of ports of the first network switch includes a third MAC address that is also included in the first port of the set of ports of the second network switch, and, when the link is determined to exist, to record the existence of the link between the first port of the set of ports of the first network switch and the first port of the set of ports of the second network switch in the computer-readable storage medium.

In another example, a computer-readable medium, such as a computer-readable storage medium, contains, e.g., is encoded with, instructions that cause a programmable processor to construct a set of ports of a first network switch that collectively include MAC addresses of a common set of MAC addresses between the first network switch and a second network switch, construct a set of ports of the second network switch that collectively include the MAC addresses of the common set of MAC addresses, determine that a link exists between a first port of the set of ports of the first network switch and a first port of the set of ports of the second network switch when the first port of the set of ports of the first network switch includes a first MAC address and a second MAC address, a second port of the set of ports of the second network switch includes the first MAC address, a third port of the set of ports of the second network switch includes the second MAC address, and a second port of the set of ports of the first network switch includes a third MAC address that is also included in the first port of the set of ports of the second network switch, and, when the link is determined to exist, record existence of the link between the first port of the set of ports of the first network switch and the first port of the set of ports of the second network switch in a second computer-readable storage medium.

The details of one or more examples are set forth in the accompanying drawings and the description below. Other features, objects, and advantages will be apparent from the description and drawings, and from the claims.

DETAILED DESCRIPTION

Figure 1:
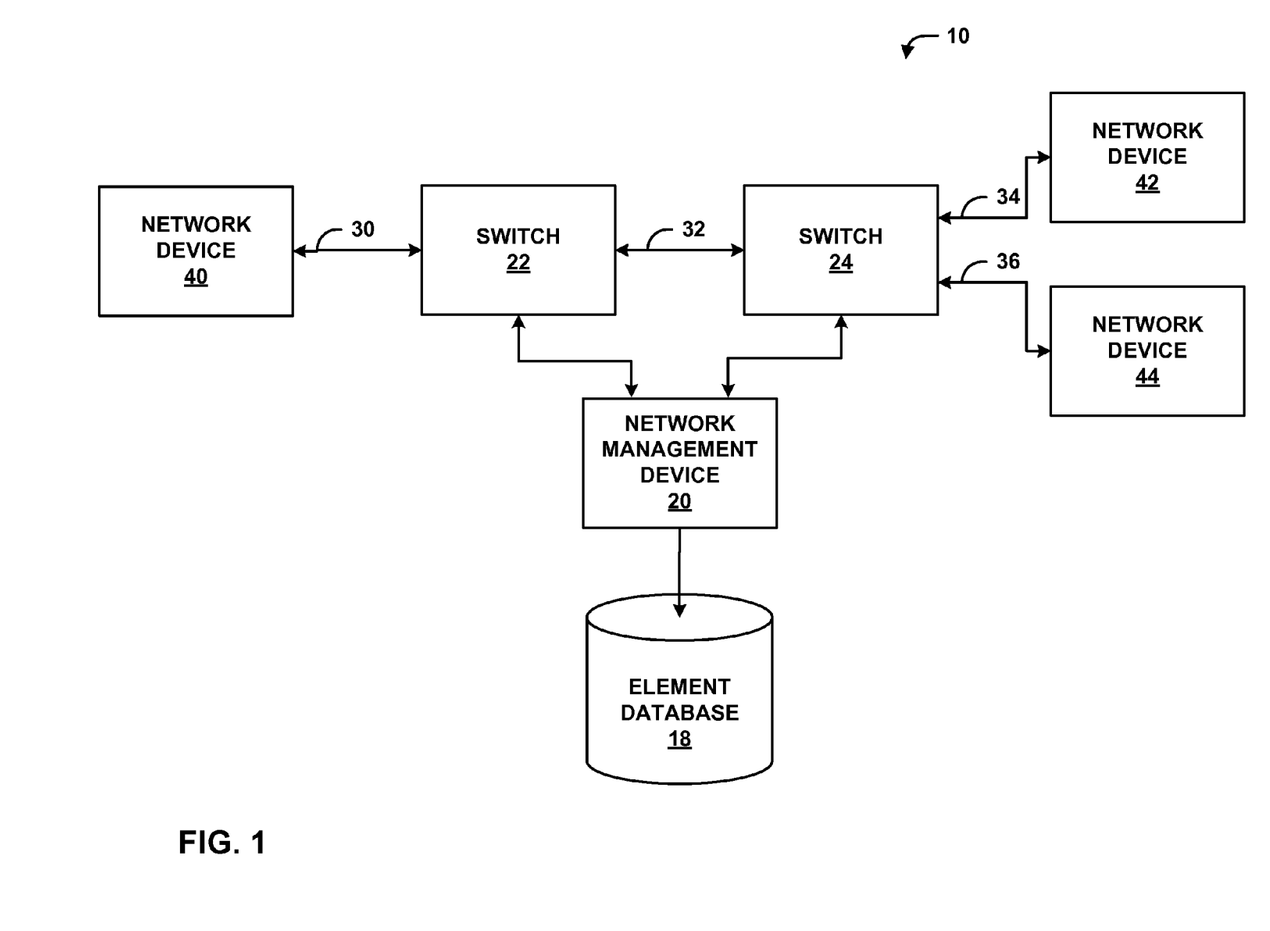
FIG. 1 is a block diagram illustrating an example network in which a network management device manages various network devices and discovers switch-to-switch links.

FIG. 1 is a block diagram illustrating an example network 10 in which a network management device 20 manages various network devices, such as switch 22 and switch 24. Network management device 20 is configured to discover switch-to-switch links in accordance with the techniques of this disclosure. The term "switch-to-switch link" in this disclosure refers to a coupling of a first port of a first switch to a second port of a second switch. Typically, a switch-to-switch link comprises a direct coupling between the first port and the second port, e.g., an Ethernet cable or optical link for which one end is connected to the first port and the other end is connected to the second port. In some examples, a switch-to-switch link also comprises a logical connection between two switches with one or more intermediate network devices between the two switches, where the intermediate network devices emulate a local area network (LAN) or virtual local area network (VLAN) over a wide area network (WAN), using VLAN stacking (also referred to as Q-In-Q), or a Layer Two Virtual Private Network (L2VPN), e.g., using Virtual Private LAN Services (VPLS). The techniques of this disclosure can also be applied to identify such switch-to-switch links as well.

Network 10 also comprises network devices 40, 42, and 44 in the example of FIG. 1. Although additional network devices are not shown for ease of explanation, it should be understood that network 10 may comprise additional network devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Network devices 40, 42, 44 may correspond to any of these network devices, or other network devices, in any arrangement. Moreover, although the elements of network 10 are illustrated as being directly coupled, it should be understood that one or more additional network elements may be included along any of links 30, 34, and/or 36, such that the network elements of network 10 are not directly coupled.

Network management device 20 implements the techniques of this disclosure to determine whether a link exists between any two switches of network 10, e.g., switch 22 and switch 24. As illustrated in the example of FIG. 1, link 32 interconnects switch 22 and switch 24. Switch 22 is also connected to network device 40 via link 30. Similarly, switch 24 is connected to network device 40 via link 32, which connects switch 24 to switch 22. Switch 24 is connected to network device 42 via link 34 and to network device 44 via link 36. When a link exists between switch 22 and switch 24, such as link 32, network management device 20 uses the techniques of this disclosure to discover the link, e.g., in order to construct a network topology. By constructing the network topology, network management device 20 determines the physical interconnection of devices within network 10, which may improve the ability of network management device 20 to manage network devices of network 10.

When network management device 20 discovers a link between two switches, network management device 20 updates element database 18 to store data describing the link and the two devices connected by the link. Network management device 20 also stores additional information regarding network elements in element database 18 for managing the network elements. In one example, network management device 20 stores one or more of a network Internet Protocol (IP) address, a media access control (MAC) address, identifiers of management protocols used to manage network elements, element models or profiles, or other management information in element database 18. In addition, in some examples, network management device 20 uses other link or topology discovery algorithms prior to applying the techniques of this disclosure. For example, network management device 20 may utilize the Link Layer Discovery Protocol (LLDP) and/or the spanning tree protocol (STP) to discover network elements and links interconnecting the network elements.

Although discussed primarily with respect to network management device 20, it should be understood that the techniques of this disclosure may be implemented by other network devices as well. For example, switches 22, 24 may implement the techniques of this disclosure in some examples to improve Layer Two (that is, Data Link Layer) functionality of the switches. Switches 22, 24, in some examples, comprise Ethernet switches.

The techniques of this disclosure recognize that, for a first switch and a second switch, where a first port of the first switch comprises a first AFT with an entry for a first MAC address and an entry for a second MAC address, a first port of the second switch comprises a second AFT with an entry for the first MAC address, a second port of the second switch comprises a third AFT with an entry for the second MAC address, a third port of the second switch comprises a fourth AFT with an entry for a third MAC address, and a second port of the first switch comprises a fifth AFT with an entry for the third MAC address, there exists a link between the first port of the first switch and the third port of the second switch. The techniques of this disclosure therefore search the network to discover arrangements of switches, ports, and MAC addresses that are reachable by the ports to discover this combination of features to determine that a link exists between two such switches.

In the example of network 10, switch 22 includes at least two ports to which links 30 and 32 respectively connect and switch 24 includes at least three ports to which links 32, 34, and 36 respectively connect. The port of switch 22 to which link 32 connects is associated with a respective address forwarding table (AFT) that stores the MAC addresses of network devices 42 and 44, and therefore, switch 22 determines that network devices 42, 44 are reachable via the associated port. Likewise, the port of switch 24 connected to link 34 is associated with a respective AFT that stores the MAC address of network device 42, while the port of switch 24 connected to link 36 is associated with a respective AFT that stores the MAC address of network device 44. Moreover, the port of switch 24 connected to link 32 is associated with an AFT including an entry for the MAC address of network management device 20, and the port of switch 22 connected to link 30 is also associated with an AFT including an entry for the MAC address of network management device 20. Accordingly, network management device 20 can determine that link 32 exists between switch 22 and switch 24, as well as the ports of switch 22 and switch 24 to which link 32 is connected.

The techniques of this disclosure primarily analyze each port of a switch, rather than each MAC address that is reachable by the switch. That is, rather than iterating through each MAC address, as is done by conventional techniques, the techniques of this disclosure iterate through each port of a switch. Typically, the number of MAC addresses that are reachable by a switch will be on the order of thousands, tens of thousands, or even hundreds of thousands, while the number of ports of a switch are much less, e.g., approximately ten to several hundred.

Initially, network management device 20 prepares a first set including all MAC addresses of switch 22 and a second set including all MAC addresses of switch 24. Network management device 20 then constructs a third set having all MAC addresses that are common to both the first set and the second set and removes the MAC addresses of the interfaces of switch 22 and 24 from the third set. Network management device 20 then determines whether the third set has at least three MAC addresses remaining.

Assuming that at least three MAC addresses remain in the third set, network management device 20 then prepares a first list of all ports on switch 22 that collectively have the common set of MAC addresses in their address forwarding tables (AFTs) and prepares a second list of all ports on switch 24 that collectively have the common set of MAC addresses in their AFTs. Next, network management device 20 determines whether the first list has at least two ports and the second list has at least three ports, or whether the first list has at least three ports and the second list has at least two ports. Network management device 20 chooses the switch with at least three ports as a right-hand-side (RHS) switch and the switch with at least two ports as the left-hand-side (LHS) switch. With respect to the example of FIG. 1, switch 22 corresponds to the LHS switch, while switch 24 corresponds to the RHS switch.

Figure 5A:
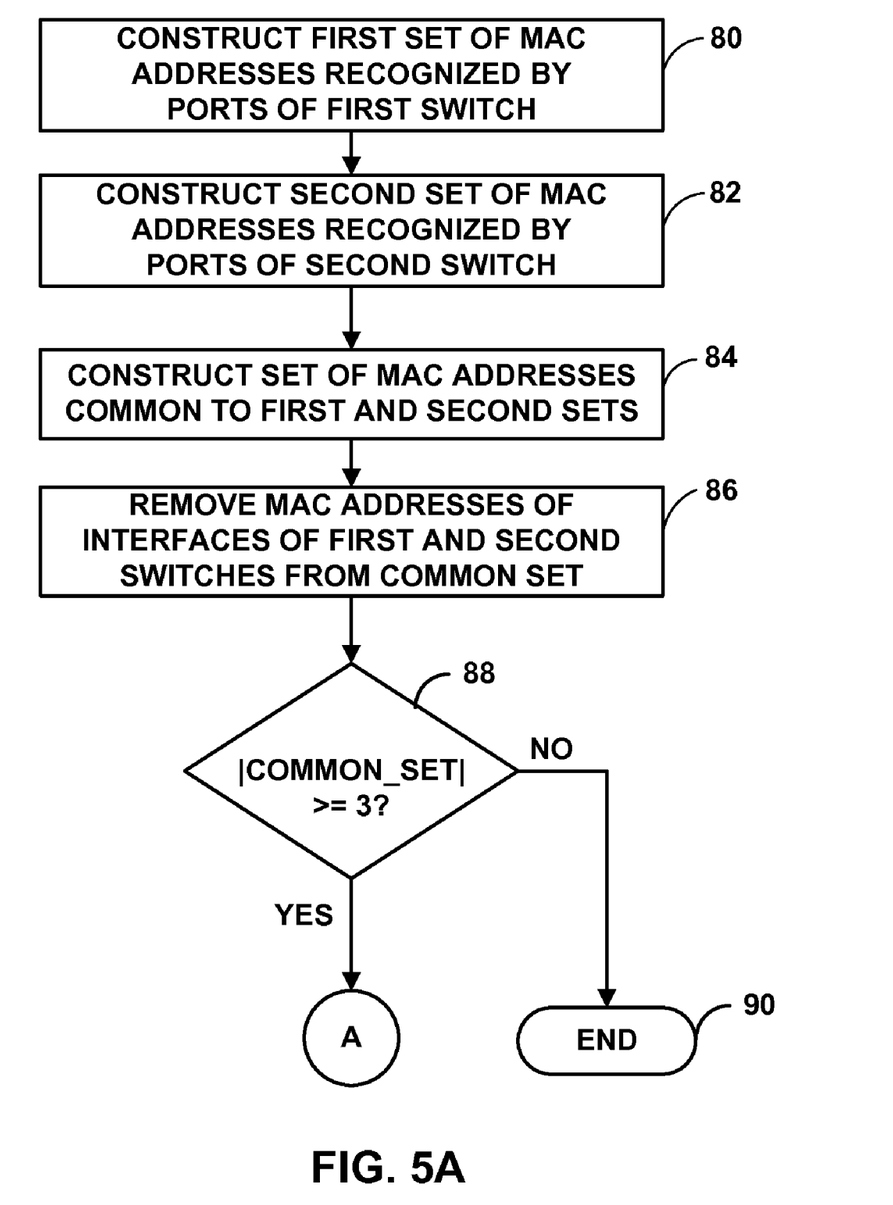
FIG. 5A is a flowchart illustrating an example method for constructing a common set of MAC addresses between two switches of a network.
Figure 5B:
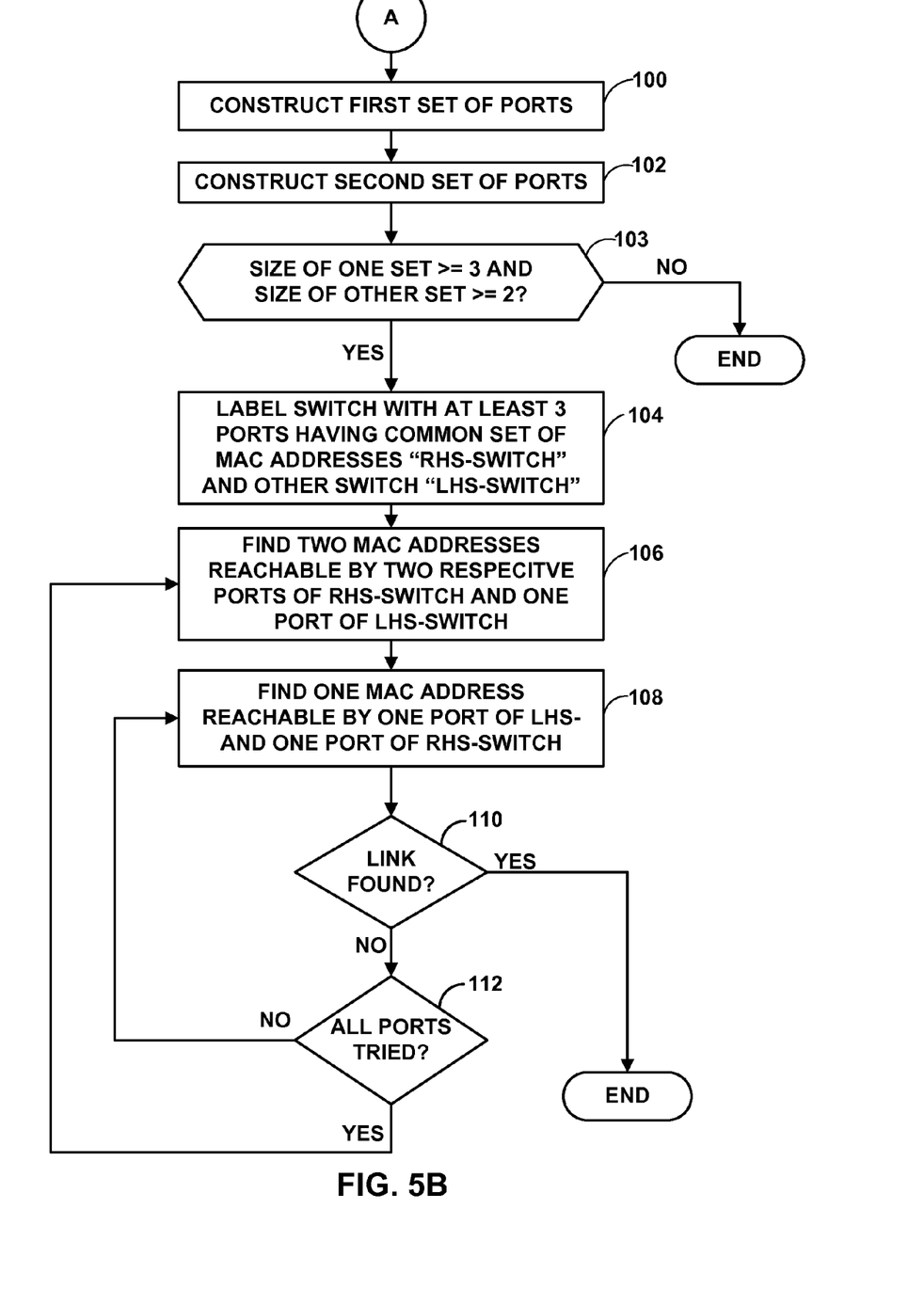
FIG. 5B is a flowchart illustrating an example method for identifying switch-to-switch links in a network using the common set constructed according to the method of FIG. 5A.

Network management device 20 then attempts to identify a link between a particular port of the RHS switch and a particular port of the LHS switch. In one example, network management device 20 identifies link 32 as a switch-to-switch link according to the method of FIG. 5, discussed below. In this manner, network management device 20 discovers link 32 between switch 22 and switch 24, as well as the particular ports of switch 22 and switch 24 to which link 32 is connected. Moreover, by repeatedly applying these techniques, network management device 20 discovers switch-to-switch links between other switches in network 10. Upon discovering a switch-to-switch link, network management device 20 records existence of the link, as well as identifiers of the ports and switches connected by the link, in a computer-readable storage medium, such as element database 18. In other examples, the existence of the link may be recorded in other computer-readable storage media such as, for example, RAM, a hard drive, a flash drive, a floppy disk, optical recording media such as a CD-ROM, or any other suitable computer-readable storage media.

Figure 2A:
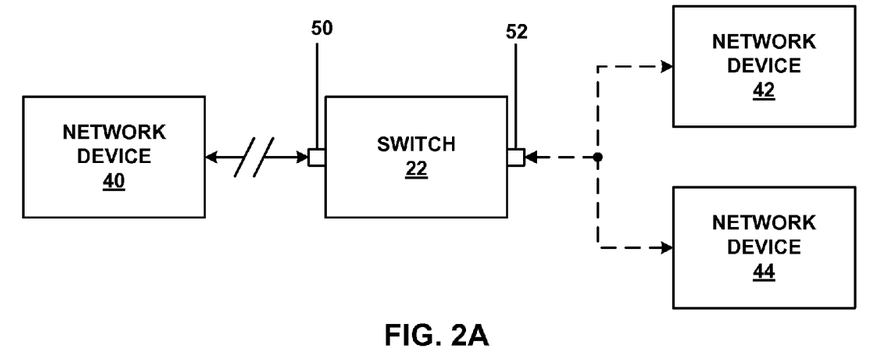
FIG. 2 is a block diagram illustrating an example arrangement of network elements for illustrating the techniques of this disclosure.
Figure 2B:
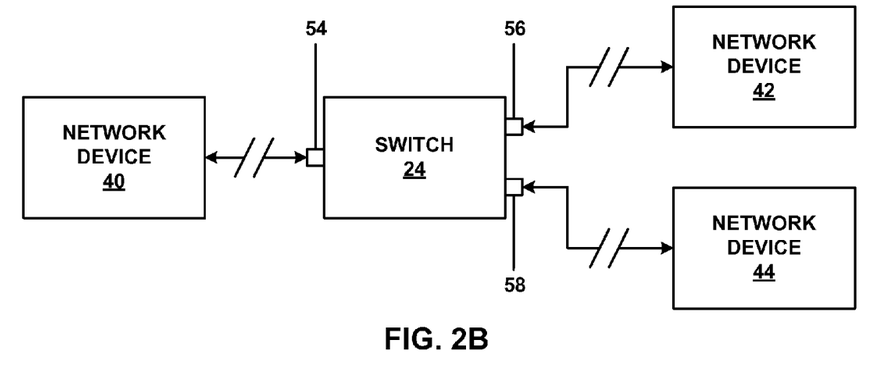

FIGS. 2A and 2B (collectively, FIG. 2) are block diagrams illustrating different phases of discovery of switch-to-switch links between switches of the example arrangement of network elements shown in FIG. 1, e.g., a portion of an L2 network, for illustrating the techniques of this disclosure. Arrowed lines between two network elements of FIG. 2 indicate a link that exists between the two network elements. The links portrayed in FIG. 2 are hashed to indicate that additional network elements may be present along the links at some downstream point as yet to be determined.

In the example of FIG. 2A, switch 22 includes ports 50 and 52, and in the example of FIG. 2B, switch 24 includes ports 54, 56, and 58. Each of ports 50 and 52 of switch 22 and 54, 56, and 58 of switch 24 are associated with a respective address forwarding table (AFT) that records MAC addresses that have been learned via switches 22 or 24 as reachable by the port. That is, as an L2 device, switches 22 and 24 receive and forwards L2 traffic. During this process, switch 22, for example, generally floods L2 traffic destined for a MAC address that has not previously been "learned" via the switch. When forwarding L2 communications, switch 22 records source MAC addresses of the communications in association with the port on which the inbound L2 communication was received. In this way, the L2 device builds AFTs that identify MAC addresses that are reachable via the port. Upon subsequently receiving an L2 communication destined for a learned MAC address, switch 22 forwards the L2 communication to the particular port on which the MAC address is reachable rather than flooding the L2 communication to all portions. In the example of FIG. 2, AFTs associated with ports 50 and 54 each include entries for the MAC address of network device 40, as communications from network device 40 have been previously received. As such, switch 22 has learned that network device 40 is reachable via port 50. Similarly, AFTs of ports 52 and 56 each include the MAC address of network device 42, and AFTs associated with ports 52 and 58 each include the MAC address of network device 44 as devices 42, 44 are reachable via these ports.

In FIG. 2A, a dashed line is used to represent the link connecting switch 22 via port 52 to network device 42 and network device 44 because, using the AFTs of switch 22 alone, the relationship in terms of the network topology between network device 42 and network device 44 cannot be determined. That is, using only the information available from the AFT of port 52, it cannot be determined whether a packet sent to network device 42 would flow through network device 44, whether a packet sent to network device 44 would flow through network device 42, or whether a packet sent to one of network device 42 or network device 44 would ever flow through the other network device. When information from the AFT of port 52 is combined with information from the AFTs of ports 50, 54, 56, and 58, however, it can be determined that, in fact, the link from switch 22 to network devices 42 and 44 diverges, namely at switch 24.

As an example, when network device 40 sends a packet intended for network device 42, network device 40 sends the packet to switch 22, which receives the packet at port 50. Switch 22 determines, by checking AFTs of its various ports, including port 52, through which port to forward the received packet. Because the AFT of port 52 includes the MAC address of network device 42, switch 22 forwards the packet through port 52. Similarly, when network device 40 sends a packet intended for network device 44, switch 22 checks the AFTs of its ports, determines that the AFT of port 52 includes the MAC address of network device 44, and forwards the packet through port 52. Switch 22 generally has no knowledge of the network topology, so switch 22 cannot determine what other network devices will receive either of these packets, except that ultimately the packets will arrive at the proper destinations.

On the other hand, when switch 24 receives a packet intended for network device 42, switch 24 forwards the packet through port 56, which includes the MAC address of network device 42 in its AFT. When switch 24 receives a packet intended for network device 44, however, switch 24 forwards the packet through port 58. When switch 24 receives a packet intended for network device 40, switch 24 forwards the packet through port 54. Similarly, when switch 22 receives a packet intended for network device 40, switch 22 forwards the packet through port 50.

It can be shown that, because port 50 and port 54 include the MAC address for network device 40 in their respective AFTs, port 52 and port 56 include the MAC address for network device 42, and port 52 and port 58 include the MAC address for network device 44, there exists a link between port 52 of switch 22 and port 54 of switch 24. First, it is evident that because switch 22 and switch 24 are each connected to each of network devices 40, 42, and 44, there must exist a link between a port of switch 22 and a port of switch 24. If this were not the case, there would be a violation of the requirement that the forwarding within the network be loop free and well formed, e.g., by use of the spanning tree protocol. That is, if there were not a link between a port of switch 22 and a port of switch 24, switch 22 and switch 24 would lie on different links between network device 40 and network devices 42 and 44, which results in a loop. Thus there must exist a link between a port of switch 22 and a port of switch 24. In particular, it should be noted that the term "link" as used in this disclosure refers to a link between ports that are in a "forwarding" state and not ports that are in a "blocking" state. In general, the techniques of this disclosure are used to identify switch-to-switch links between ports in a forwarding state, because those ports that are in a forwarding state will be used to identify MAC addresses that are reachable, whereas ports in a blocking state will not be used to identify reachable MAC addresses.

In particular, the link must exist between port 52 of switch 22 and port 54 of switch 24. Suppose instead that the link was between port 50 of switch 22 and port 54 of switch 24. This would result in a conflict when a packet for either of network device 42 or network device 44 was received by switch 22 or switch 24. If the link instead existed between port 50 of switch 22 and port 58 of switch 24, a conflict would occur upon receipt by switch 22 and/or switch 24 of a packet intended for network device 42. If the link instead existed between port 50 of switch 22 and port 56 of switch 24, a conflict would occur upon receipt by switch 22 and/or switch 24 of a packet intended for network device 44. If the link instead existed between port 52 of switch 22 and port 56 of switch 24, a conflict would occur upon receipt by switch 22 and/or switch 24 of a packet intended for network device 40. If the link instead existed between port 52 of switch 22 and port 58 of switch 24, a conflict would occur upon receipt by switch 22 and/or switch 24 of a packet intended for network device 40.

Moreover, it is evident that switch 24 must be a termination point of links that connect to both network device 42 and network device 44, because switch 24 splits such links at ports 56 and 58. Thus it can be determined that switch 24 is on the right-hand-side, in the arrangement of devices in FIG. 2, of the link between switch 22 and switch 24, which necessarily implies that switch 22 is on the left-hand-side.

The techniques of this disclosure utilize the requirements described above to discover switch-to-switch links in an efficient manner. In particular, network management device 20 (FIG. 1) retrieves the AFTs of each of port of switches 22 and 24, including ports 50, 52, 54, 56, and 58, e.g., via SNMP or another management or communication protocol, to perform the techniques of this disclosure. FIG. 2A represents a first phase of discovery of a switch-to-switch link, during which network management device 20 discovers switch 22 and retrieves AFTS from ports of switch 22, including AFTs from ports 50 and 52. FIG. 2B represents a second phase of discovery of the switch-to-switch link, during which network management device 20 discovers switch 24 and retrieves AFTs from ports of switch 24, including AFTs from ports 54, 56, and 58.

In accordance with the techniques of this disclosure, network management device 20 constructs a common set of MAC addresses between ports of switch 22 and ports of switch 24. That is, after retrieving AFTs from the ports of switches 22 and 24, network management device 20 constructs a first set comprising all MAC addresses that are reachable by at least one port of the first switch, e.g., switch 22, and a second set comprising all MAC addresses that are reachable by at least one port of the second switch, e.g., switch 24. The common set of MAC addresses comprises the intersection of the first set and the second set, such that each element of the common set occurs at least once in the first set and at least once in the second set. Network management device 20 removes the MAC addresses of ports 50, 52, 54, 56, and 58 from the common set of MAC addresses. When the common set of MAC addresses includes at least three MAC addresses, network management device 20 proceeds to determine whether a switch-to-switch link is present between the two switches, e.g., switch 22 and switch 24.

To determine whether a switch-to-switch link is present, network management device 20 attempts to identify two MAC addresses that are each reachable by one port of a first network device, e.g., port 52 of switch 22, and where each of the two MAC addresses are reachable by respective ports of a second switch, e.g., port 56 and port 58 of switch 24. In the example of FIG. 2, the two MAC addresses are the MAC addresses of network devices 42 and 44, where network devices 42 and 44 are reachable by port 52 of switch 22, network device 42 is reachable by port 56 of switch 24, and network device 44 is reachable by port 58 of switch 24. Network management device 20 also attempts to identify a MAC address that is reachable by both a port of the first switch and a port of the second switch. In the example of FIG. 2, the MAC address is that of network device 40, and the ports by which network device 40 is reachable include ports 50 and 54.

To accomplish this port identification, network management device 20 creates a first list of all ports of the first switch that collectively include the common set of MAC addresses and a second list of all ports of the second switch that collectively include the common set of MAC addresses. Network management device 20 then iterates through the first and second lists to determine whether the situation described above occurs, namely, that two MAC addresses are each reachable by one port of the first network device such that each of the two MAC addresses are reachable by respective ports of the second switch, and another MAC address is reachable by both a port of the first switch and a port of the second switch. Greater details regarding this process are described below with respect to FIGS. 5A and 5B.

Figure 3:
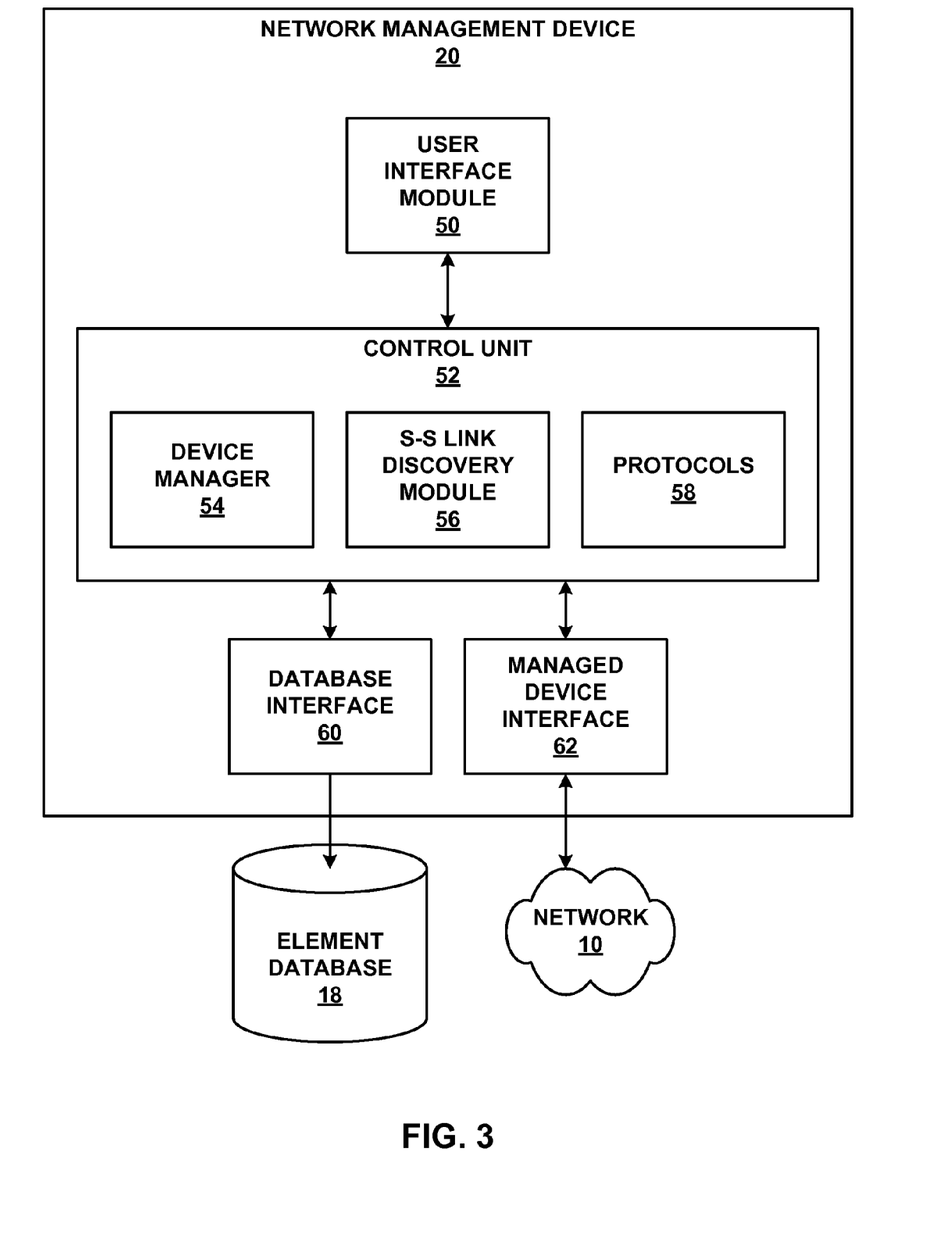
FIG. 3 is a block illustrating an example set of components of a network management device that is configured to discover switch-to-switch links in a network.

FIG. 3 is a block illustrating an example set of components of network management device 20 that is configured to discover switch-to-switch links in a network. In the example of FIG. 3, network management device 20 includes user interface module 50, control unit 52, database interface 60, and managed device interface 62. User interface module 50 comprises instructions to send/receive data to/from one or more of a display, keyboard, mouse, stylus, touchscreen, or other interface for presenting and receiving data to/from a user. An administrator interacts with network management device 20 via user interface module 50 to perform various management tasks using network management device 20. In one example, the administrator selects an option, using a user interface controlled by user interface module, to cause network management device 20 to initiate the techniques of this disclosure to determine and record a topology of the network.

Control unit 52 comprises hardware for performing the techniques of this disclosure. For example, control unit 52 may comprise a processor, such as one or more programmable processors, microprocessors, application specific integrated circuits, field programmable gate arrays, digital signal processors, or other equivalent integrated or discrete logic circuitry. Control unit 52 may comprise one or more processors that execute software instructions, such as those used to define a software or computer program, stored to a computer-readable storage medium, such as a storage device (e.g., a disk drive, or an optical drive), or memory (e.g., a Flash memory, random access memory, or RAM) or any other type of volatile or non-volatile memory that stores instructions (e.g., in the form of a computer program or other executable) to cause a programmable processor to perform the techniques described herein. Alternatively, control unit 34 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), one or more Digital Signal Processors (DSPs) or any combination of the foregoing examples of dedicated hardware, for performing the techniques described herein. In general, control unit 52 may comprise any combination of hardware, software, and/or firmware to effect the techniques of this disclosure.

In the example of FIG. 3, control unit 52 comprises device manager 54, switch-to-switch (S-S) link discovery module 56, and protocols 58, which may comprise software modules executed by control unit 250 or discrete, independent hardware units of control unit 250. When any or all of device manager 54, S-S link discovery module 56, and protocols 58 comprise software, e.g., executable software modules, instructions executable by a processor for device manager 54, S-S link discovery module 56, and protocols 58 may be encoded in a computer-readable storage medium of network management device 20.

Device manager 54 interacts with one or more managed devices, e.g., switches 22 and 24 and/or network devices 40, 42, and 44, to manage the network devices. In one example, device manager 54 executes an implementation of SNMP. Device manager 54 sends electrical signals to the managed network devices via managed device interface 62, which is coupled to the managed network devices of network 10. Managed device interface 62 comprises one or more network interface cards, and therefore is also referred to as a "network interface." Therefore, device manager 54 sends and receives packets comprising data for managing the managed network devices directly or indirectly via network 10 to the managed network devices. Device manager 54 also utilizes database interface 60 to retrieve and store configuration information from element database 18 for managed network devices of network 10.

S-S link discovery module 56 implements and executes the techniques of this disclosure for discovering switch-to-switch links between switches of network 10. Upon discovering a switch-to-switch link, S-S link discovery module 56 updates a network topology stored by element database 18 via database interface 60. In some examples, S-S link discover module 56, or a separate module of control unit 52, implements one or more additional network topology discovery algorithms, such as the spanning tree protocol and/or LLDP. Protocols 58 comprise one or more network protocols for communicating over a network. For example, protocols 58 may comprise point-to-point protocol (PPP), PPP over Ethernet (PPPoE), and/or PPP over ATM (PPPoA) for communicating with managed network devices. Protocols 58 also include device management protocols, such as Device Management Interface (DMI) or Simple Network Management Protocol (SNMP). Control unit 52 executes one or more of protocols

58 to communicate with managed network devices or other network devices via managed device interface 62.

Figure 4:
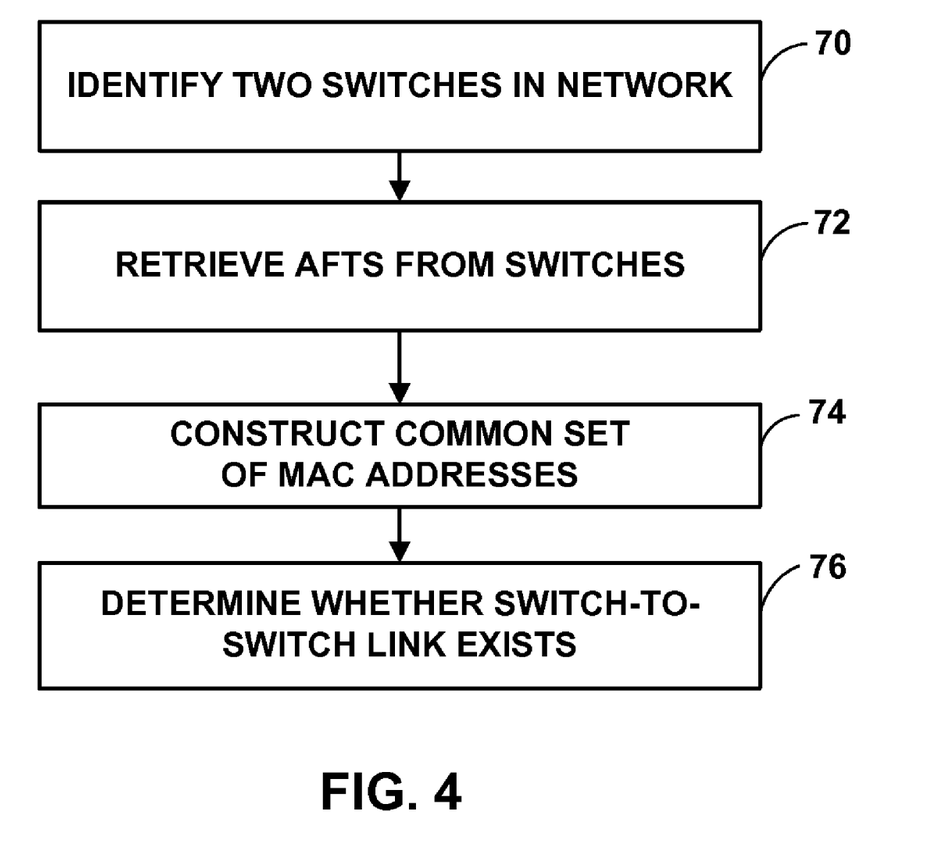
FIG. 4 is a flowchart illustrating an example method for locating a switch-to-switch link in a computer network.

FIG. 4 is a flowchart illustrating an example method for locating a switch-to-switch link in a computer network. The method of FIG. 4 is described with respect to S-S link discovery module 56 of FIG. 3 for purposes of example, although it should be understood that other devices, modules, and/or units can also perform the method of FIG. 4. Initially, S-S link discovery module 56 identifies two switches in a network to determine whether a link exists between those two switches (70). With respect to the example of FIGS. 1 and 2, S-S link discovery module 56 identifies switches 22 and 24.

S-S link discovery module 56 then retrieves each AFT associated with respective ports of the two switches (72). That is, for each port of each switch, S-S link discovery module 56 retrieves data from a corresponding AFT of the port. In one example, S-S link discovery module 56 retrieves data from the AFTs via SNMP. In another example, S-S link discovery module 56 retrieves data from the AFTs via DMP. The data that S-S link discovery module 56 retrieves from the AFTs comprises MAC addresses that are reachable from the corresponding port, as well as the number of ports of each switch. Because the AFTs are each associated with a respective port, S-S link discovery module 56 can determine which MAC addresses are reachable from each port.

Next, S-S link discovery module 56 constructs a common set of MAC addresses that are reachable from the ports of the first switch and the ports of the second switch (74). FIG. 5A, described below, illustrates an example method for constructing the common set of MAC addresses in greater detail. In general, the common set of MAC addresses comprises a set of MAC addresses such that each MAC address in the common set is reachable from at least one port of the first switch and at least one port of the second switch.

Finally, using the constructed common set of MAC addresses and other data retrieved from the switches, S-S link discovery module 56 determines whether a link exists between the two switches (76). The method of FIG. 5B is one example for determining whether a link exists between the two switches. In general, the determination involves determining whether a MAC address is reachable by a first port of the first switch and by a first port of the second switch, two MAC addresses are reachable by a second port of the first switch, one of the two MAC addresses reachable by the second port of the first switch is also reachable by a second port of the second switch, and the other of the two MAC addresses is also reachable by a third port of the second switch. S-S link discovery module 56 iterates over the ports of each switch to determine whether some combination of ports results in this situation. When such a combination of ports are found, S-S link discovery module 56 determines that a switch exists.

FIG. 5A is a flowchart illustrating an example method for constructing a common set of MAC addresses for a pair of L2 devices in preparation for performance of the method of FIG. 5B to determine whether a switch-to-switch link exists between the devices. Although described with respect to S-S link discover module 56 of network management device 20, it should be understood that the method of FIG. 5A may be performed by other devices. Initially, S-S link discovery module 56 constructs a first set of MAC addresses that are recognized as reachable by any of the ports of a first switch, e.g., switch 22 (80). S-S link discovery module 56 retrieves the MAC addresses from switch 22 by requesting the addresses according to a management protocol, e.g., DMI or SNMP. S-S link discovery module 56 then constructs the list of all MAC addresses reachable by any of the ports of the first switch. The set may be stored within any suitable data structure, e.g., an array, a linked list, a tree, a table, or other data structure, for storing MAC addresses. In a similar manner, S-S link discovery module 56 constructs a second set of MAC addresses reachable by any of the ports of a second switch, e.g., switch 24 (82).

S-S link discovery module 56 then constructs a set of MAC addresses that are common to both the first and second sets of MAC addresses (84). That is, the common set comprises the intersection of the first set of MAC addresses and the second set of MAC addresses. In this manner, the common set comprises only those MAC addresses that are reachable by at least one port of the first switch and by at least one port of the second switch. In one example, S-S link discovery module 56 removes MAC addresses of the interfaces of the first and second switches from the common set (86).

S-S link discovery module 56 then determines whether the common set of MAC addresses has at least three switches remaining (88). In one example, S-S link discovery module 56 iterates through each of the MAC addresses stored by the data structure used to store the common set and counts each element. In another example, the data structure storing the common set provides a .size( ) or .length( ) operation, which S-S link discovery module 56 uses to determine the number of elements stored by the data structure.

When the common set of MAC addresses has fewer than three MAC addresses remaining ("NO" branch of 88), existence of a link between the first and second switches cannot be determined for certain, so the process ends (90). S-S link discovery module 56 may then repeat the process for a different pair-wise combination of switches deployed within the managed network until all switch-to-switch links have been identified and recorded. In the event at least three MAC addresses remain in the common set ("YES" branch of 88), the process continues, as described with respect to FIG. 5, to determine the exact orientation of the switch-to-switch link between the selected pair of switches.

FIG. 5B is a flowchart illustrating an example method for identifying the switch-to-switch link between two L2 devices in a network using the common set of MAC addresses reachable by both of the L2 devices as constructed according to the method of FIG. 5A. Although described with respect to S-S link discover module 56 of network management device 20, it should be understood that the method of FIG. 5 may be performed by other devices. It is further assumed that a method similar to that of FIG. 5A is performed for a selected pair of L2 devices prior to performing the method of FIG. 5, to construct a set of MAC addresses, excluding the MAC addresses of the interfaces of the first and second switch, common to both the first and second switch, and that the common set includes at least three MAC addresses.

S-S link discovery module 56 constructs a first set representative of ports of the first switch that are associated with respective AFTs that collectively include the common set of MAC addresses (100). That is, for each port of the first switch, if the port is associated with an AFT that includes at least one MAC address of the common set of MAC addresses, an entry representative of the port is included in the constructed first set of ports. Again, the set representative of the ports may be represented as any suitable data structure having port identifiers, e.g., a linked list, an array, a tree, a table, or any other suitable data structure. Similarly, S-S link discovery module 56 constructs a second set representative of ports of the second switch that are associated with AFTs that collectively include the common set of MAC addresses (102). That is, for each port of the second switch, if the port is associated with a respective AFT that includes at least one MAC address of the common set of MAC addresses, an entry representative of the port is included in the constructed second set of ports.

In the example of FIG. 5B, S-S link discovery module 56 then determines whether at least one of the sets of ports has at least two ports and the other has at least two ports (103). Specifically, S-S link discovery module 56 determines whether the first set of ports comprises at least two entries and the second set of ports comprises at least three entries, or whether the first set of ports comprises at least three entries and the second set of ports comprises at least two entries. If neither case is true ("NO" branch of 103), S-S link discovery module 56 ends the link discovery process. Otherwise ("YES" branch of 103), S-S link discovery module 56 labels (i.e., logically views) one of the first switch and the second switch that includes at least three ports that collectively form the common set of MAC addresses as the "right-hand-side switch," or "RHS-switch." Likewise, S-S link discovery module 56 labels the other switch "left-hand-side switch" or "LHS-switch" (104). In the case that both the first and second switches include at least three ports, S-S link discovery module 56 treats the first switch as the LHS-switch and the second switch as the RHS-switch in an attempt to determine whether a link exists. For example, as shown in FIG. 2A, network devices 40, 42, and 44 are collectively reachable from ports 50 and 52 of switch 22, and as shown in FIG. 2B, network devices 40, 42, and 44 are collectively reachable from ports 54, 56, and 58 of switch 24. Because the list of ports for switch 22 has two entries (port 50 and port 52) and the list of ports for switch 24 has three entries (port 54, port 56, and port 58), switch 22 is treated as the LHS-switch and switch 24 is treated as the RHS-switch.

S-S link discovery module 56 then iterates through the ports of the LHS-switch included in the respective one of the sets of ports and the ports of the RHS-switch included in the respective one of the sets of ports to find a set of three ports with the property that the port of the LHS-switch reaches both a first MAC address and a second MAC address, the first port of the RHS-switch reaches the first MAC address, and the second port of the RHS-switch reaches the second MAC address (106). That is, assuming that the first switch is the LHS-switch and the second switch is the RHS-switch, S-S link discovery module 56 iterates through the ports of the first set of ports until a port of the first set of ports is identified that reaches two MAC addresses, one of which is reachable by one port of the second set of ports and another of which is reachable by another port of the second set of ports. For example, in reference to FIG. 2, S-S link discovery module 56 iterates through ports 50 and 52 of switch 22 (the LHS-switch) and ports 54, 56, and 58 of switch 24 (the RHS-switch), and determines that from port 52, the MAC addresses of network devices 42 and 44 are reachable, and likewise, the MAC address of network device 42 is reachable from port 56 and the MAC address of network device 44 is reachable from port 58.

Upon identifying the port from the first set of ports, S-S link discovery module 56 then attempts to find a port of the LHS-switch, excluding from consideration the port identified in step 106, that includes at least one MAC address that is also reachable by a port of the RHS-switch, again excluding from consideration the two ports of the RHS-switch identified in step 106 (108). That is, S-S link discovery module 56 iterates through each remaining port of the LHS-switch and the RHS-switch to find two ports through which the same MAC address is reachable, one port from the LHS-switch and one port from the RHS-switch. When such a pair of ports is identified, S-S link discovery module 56 determines that a link exists between the port of the RHS-switch identified in step 108 and the port of the LHS-switch identified in step 106. For example, in reference to FIG. 2, S-S link discovery module 56 determines that the MAC address of network device 40 is reachable by both port 50 of switch 22 and port 54 of switch 24.

In some examples, S-S link discovery module 56 performs a further check to ensure that a link exists between these ports by determining whether the port of the RHS-switch identified in step 108 and the port of the LHS-switch identified in step 106 have any MAC addresses in common. When a link exists between these two ports, there should not be any MAC addresses in common. That is, an intersect operation performed on the port of the RHS-switch identified in step 108 and the port of the LHS-switch identified in step 106 should yield an empty set, if there is in fact a link between these two ports.

If a link has not been found by this point ("NO" branch of 110), S-S link discovery module 56 returns to step 108 to try a different pair of ports between the LHS-switch and the RHS-switch where the two ports each can be used to reach a common MAC address. When all ports of the LHS-switch and the RHS-switch have been tried after repeated instances of step 108 without successfully identifying a link ("YES" branch of 112), S-S link discovery module 56 returns to step 106 to try a different port of the LHS-switch and two ports of the RHS-switch such that the two MAC addresses that are each reachable by the port of the LHS-switch are also reachable by respective ports of the RHS-switch.

S-S link discovery module 56 may then repeat the processes set forth in FIGS. 4-5 for a different pair-wise combination of switches deployed within the managed network until all switch-to-switch links have been identified and recorded.

An example algorithm for performing the method of FIG. 5 is presented below. The algorithm presented below iterates through the ports of the LHS-switch (e.g., switch 22) and the RHS-switch (e.g., switch 24) as indicated to determine whether a link exists between the LHS-switch and the RHS-switch, as well as the ports to which such a link connects. With respect to the example of FIG. 2, $P_{1\text{-}LHS}$ corresponds to port 50 of switch 22, $P_{2\text{-}LHS}$ corresponds to port 52 of switch 22, $P_{1\text{-}RHS}$ corresponds to port 54 of switch 24, $P_{2\text{-}RHS}$ corresponds to port 56 of switch 24, and $P_{3\text{-}RHS}$ corresponds to port 58 of switch 24.

Loop-1-Start: For each port ($P_{2\text{-}LHS}$) in the set of ports of the LHS-switch having the common set of MAC addresses, do:
  Iterate through the ports in the set of ports of the RHS-switch having the common set of MAC addresses to identify two ports ($P_{2\text{-}RHS}$, $P_{3\text{-}RHS}$) having common MAC addresses with $P_{2\text{-}LHS}$. That is, identify port $P_{2\text{-}RHS}$ through which MAC address $MAC_1$ is reachable, where $MAC_1$ is also reachable through $P_{2\text{-}LHS}$, and identify MAC address $MAC_2$ that is reachable by both $P_{3\text{-}RHS}$ and $P_{2\text{-}LHS}$.

If $P_{2\text{-}RHS}$ and $P_{3\text{-}RHS}$ not found, go to Loop-1-Start to try the next port in the set of ports of the LHS-switch having the common set of MAC addresses.

Loop-2-Start: For each port ($P_{1\text{-}LHS}$) in the set of ports of the LHS-switch having the common set of MAC addresses (excluding $P_{2\text{-}RHS}$), do:
  Iterate through each port in the set of ports of the RHS-switch having the common set of MAC addresses (skipping $P_{2\text{-}RHS}$ and $P_{3\text{-}RHS}$) until one port in the set of ports of the LHS-switch having the common set of MAC addresses has common MAC addresses with $P_{1\text{-}LHS}$.

If found, then $P_{1\text{-}LHS}$ and $P_{1\text{-}RHS}$ are identified, so break from Loop-2.

Loop-2-End

If $P_{1\text{-}LHS}$, $P_{2\text{-}LHS}$, $P_{1\text{-}RHS}$, $P_{2\text{-}RHS}$, and $P_{3\text{-}RHS}$ are identified, then go to the next step. Else continue Step-1 in Loop-2 iterating over the next port in the set of ports of the RHS-switch having the common set of MAC addresses.

Check if $P_{2\text{-}LHS}$ and $P_{1\text{-}RHS}$ have any MAC addresses in common between their address forwarding tables (AFTs). If there are no common MAC addresses found, then a link between P2-LHS on Switch-On-LHS and P1-RHS on Switch-On-RHS is discovered.

Loop-1-End

As an example operation of the method of FIGS. 4 and 5, assume that network device 40 of FIG. 2 has a MAC address of "1," network device 42 has a MAC address of "2," and network device 44 has a MAC address of "3." Assume further that port 50 includes MAC addresses {1, 4, 8, 10} in its address forwarding table (AFT) and port 52 includes MAC addresses {2, 3, 7, 9, 16} in its AFT. Also assume that port 54 includes MAC addresses {1, 4}, port 56 includes MAC addresses {2, 11}, and port 58 includes MAC addresses {3, 14}.

According to the method of FIG. 5A, a network device, e.g., network management device 20, first constructs a first set of MAC addresses that are reachable by all, that is, a combination of, ports of a first switch, which is assumed to be switch 22 for the purposes of this example. The first set of MAC addresses therefore includes {1, 2, 3, 4, 7, 8, 9, 10, and 16}. The network device also constructs a second set of MAC addresses reachable by ports of a second switch, switch 24 in this example. Thus, the second set of MAC addresses includes {1, 2, 3, 4, 11, 14}. The network device then constructs a common set of MAC addresses comprising the union of the first and second sets. In this example, the common set of MAC addresses comprises {1, 2, 3, 4}. The MAC addresses of the individual ports of each switch have not been discussed for purposes of brevity in this example, but the network device would ordinarily remove the MAC addresses of the ports of the first and second switches from the common set of MAC addresses at this point.

The network device then determines whether the common set includes at least three addresses. In this example, the set has four elements, which is greater than three, so the network device begins to perform the method of FIG. 5. The network device proceeds to construct a first set of ports of the first switch that collectively include the common set of MAC addresses. That is, a port is included in this set when the port includes at least one MAC address that is included in the common set of MAC addresses. Port 50 includes MAC addresses 1 and 4, so port 50 is included in the first set of ports. Port 52 includes MAC addresses 2 and 3, so port 52 is also included in the first set of ports. Other ports of switch 22 would not be included in the first set of ports, although no other ports are depicted in the example. Thus the first set of ports comprises ports 50 and 52.

The network device then proceeds to construct a second set of ports of switch 24 that collectively include the common set of MAC addresses. Port 54 includes MAC addresses 1 and 4, port 56 includes MAC address 2, and port 58 includes MAC address 3, so each of ports 52, 54, and 56 are included in the second set of ports. Additionally, in this example, switch 24 is labeled as the right-hand-side switch ("RHS-switch"), because the second set of ports, associated with switch 24, includes at least three elements. Likewise, switch 22 is labeled as the left-hand-side switch ("LHS-switch").

The network device then attempts to find two ports of the set of ports of the RHS-switch, that is, switch 24, having common MAC addresses with one port of the set of ports of the LHS-switch. In this example, port 56 of switch 24 includes MAC address 2 and port 58 of switch 24 includes MAC address 3, while port 52 of switch 22 includes both MAC addresses 2 and 3.

Next, the network device attempts to find a remaining port of the set of ports of the RHS-switch that includes a MAC address also reachable by a remaining port of the set of ports of the LHS-switch. In this case, port 54 of switch 24 includes MAC address 1, and port 50 of switch 22 also includes MAC address 1. As a final check, the network device determines whether port 54 of switch 24 includes any of the MAC addresses of port 52 of switch 22, e.g., by performing an intersection operation on their AFTs. In this example, no MAC address is held in common between port 52 and port 54, so the network device determines that a link exists between port 52 of switch 22 and port 54 of switch 24. The network device therefore records existence of a link between these ports in a computer-readable storage medium, e.g., an element database such as element database 18 of FIG. 1.

EXAMPLES

The method of FIGS. 4 and 5 was tested empirically within a network test bed for a switch that included X ports and approximately 135,000 MAC addresses reachable by those ports. Two modular chassis Ethernet switches were connected to one another. Each switch had 384 ports on it. Performance test equipment was connected to a port on one of the switches which could generate Ethernet packets with varying source MAC addresses at a very fast rate and push them through the switch so that they pass through the other switch. The port on the first switch to which the performance test equipment and the ports on both the switches through which they were connected had the same set of MAC addresses learnt in their AFTs. When the experiment was done, the total number of different MAC addresses in these AFTs was 135,000. Each switches were capable of holding up to 150,000 MAC addresses in the AFTs (on all combined ports). Both the conventional method and the method of this disclosure were tested using the same set of data of this empirical test. The conventional method halted having identified the correct switch-to-switch link after 265 seconds. However, the method of this disclosure halted having identified the correct link after approximately 6 seconds.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
constructing, with a network device, a set of ports of a first network switch that collectively include media access control (MAC) addresses of a common set of MAC addresses between the first network switch and a second network switch;
constructing, with the network device, a set of ports of the second network switch that collectively include the MAC addresses of the common set of MAC addresses;
determining, with the network device, that a link exists between a first port of the set of ports of the first network switch and a first port of the set of ports of the second network switch when the first port of the set of ports of the first network switch includes a first MAC address and a second MAC address, a second port of the set of ports of the second network switch includes the first MAC address, a third port of the set of ports of the second network switch includes the second MAC address, and a second port of the set of ports of the first network switch includes a third MAC address that is also included in the first port of the set of ports of the second network switch; and
when the link is determined to exist, recording, with the network device, existence of the link between the first port of the set of ports of the first network switch and the first port of the set of ports of the second network switch in a computer-readable storage medium.

2. The method of claim 1, further comprising constructing the common set of MAC addresses by:
constructing a first set of MAC addresses comprising each MAC address that is reachable by at least one port of the first network switch;
constructing a second set of MAC addresses comprising each MAC address that is reachable by at least one port of the second network switch; and
constructing the common set of MAC addresses as the union of the first set of MAC addresses and the second set of MAC addresses.

3. The method of claim 2, further comprising removing, from the common set of MAC addresses, MAC addresses of the ports of the first network switch and MAC addresses of the ports of the second network switch.

4. The method of claim 2, further comprising determining whether the common set of MAC addresses includes at least three elements before constructing the first set of ports and the second set of ports.

5. The method of claim 1, wherein determining that the link exists further comprises:
iterating through the set of ports of the second network switch to identify two ports of the set of ports of the second network switch that collectively include two MAC addresses that are also included by a port of the set of ports of the first network switch;
determining that identified one of the two ports comprises the second port of the set of ports of the second network switch, that the identified other of the two ports comprises the third port of the set of ports of the second network switch, and that the identified port of the set of the ports of the first network switch comprises the first port of the set of ports of the first network switch.

6. The method of claim 5, wherein determining that the link exists further comprises:
iterating through the set of ports of the second network switch, excluding the second port and the third port of the set of ports of the second network switch, to identify a port of the set of ports of the second network switch that includes a MAC address that is also included by a port of the set of ports of the first network switch; and
determining that the identified port of the set of ports of the second network switch comprises the first port of the second network switch and that the identified port of the set of ports of the first network switch comprises the second port of the first network switch.

7. The method of claim 1, further comprising determining that a link does not exist between the first port of the set of ports of the first network switch and the first port of the set of ports of the second network switch when the first port includes a MAC address that is also included by the first port of the set of ports of the second network switch.

8. A network device comprising:
a computer-readable storage medium;
a network interface configured to retrieve data from a first network switch and a second network switch; and
a control unit configured to construct a set of ports of the first network switch that collectively include media access control (MAC) addresses of a common set of MAC addresses between the first network switch and the second network switch, construct a set of ports of the second network switch that collectively include the MAC addresses of the common set of MAC addresses, determine that a link exists between a first port of the set of ports of the first network switch and a first port of the set of ports of the second network switch when the first port of the set of ports of the first network switch includes a first MAC address and a second MAC address, a second port of the set of ports of the second network switch includes the first MAC address, a third port of the set of ports of the second network switch includes the second MAC address, and a second port of the set of ports of the first network switch includes a third MAC address that is also included in the first port of the set of ports of the second network switch, and, when the link is determined to exist, to record the existence of the link between the first port of the set of ports of the first network switch and the first port of the set of ports of the second network switch in the computer-readable storage medium.

9. The network device of claim 8, wherein the control unit is configured to construct the common set of MAC addresses by being configured to construct a first set of MAC addresses comprising each MAC address that is reachable by at least one port of the first network switch, construct a second set of MAC addresses comprising each MAC address that is reachable by at least one port of the second network switch, and construct the common set of MAC addresses as the union of the first set of MAC addresses and the second set of MAC addresses.

10. The network device of claim 9, wherein the control unit is configured to remove, from the common set of MAC addresses, MAC addresses of the ports of the first network switch and MAC addresses of the ports of the second network switch.

11. The network device of claim 9, wherein the control unit is configured to determine whether the common set of MAC addresses includes at least three elements before constructing the first set of ports and the second set of ports.

12. The network device of claim 8, wherein to determine whether the link exists, the control unit is configured to:
iterate through the set of ports of the second network switch to identify two ports of the set of ports of the second network switch that collectively include two MAC addresses that are also included by a port of the set of ports of the first network switch;
determine that identified one of the two ports comprises the second port of the set of ports of the second network switch, that the identified other of the two ports comprises the third port of the set of ports of the second network switch, and that the identified port of the set of the ports of the first network switch comprises the first port of the set of ports of the first network switch.

13. The network device of claim 12, wherein to determine whether the link exists, the control unit is configured to:
iterate through the set of ports of the second network switch, excluding the second port and the third port of the set of ports of the second network switch, to identify a port of the set of ports of the second network switch that includes a MAC address that is also included by a port of the set of ports of the first network switch; and
determine that the identified port of the set of ports of the second network switch comprises the first port of the second network switch and that the identified port of the set of ports of the first network switch comprises the second port of the first network switch.

14. The network device of claim 8, wherein the control unit is configured to determine that a link does not exist between the first port of the set of ports of the first network switch and the first port of the set of ports of the second network switch when the first port includes a MAC address that is also included by the first port of the set of ports of the second network switch.

15. The network device of claim 8, wherein the network device comprises a network management device configured to manage the first network switch and the second network switch.

16. A non-transitory computer-readable storage medium encoded with instructions for causing a programmable processor to:
construct a set of ports of a first network switch that collectively include media access control (MAC) addresses of a common set of MAC addresses between the first network switch and a second network switch;
construct a set of ports of the second network switch that collectively include the MAC addresses of the common set of MAC addresses;
determine that a link exists between a first port of the set of ports of the first network switch and a first port of the set of ports of the second network switch when the first port of the set of ports of the first network switch includes a first MAC address and a second MAC address, a second port of the set of ports of the second network switch includes the first MAC address, a third port of the set of ports of the second network switch includes the second MAC address, and a second port of the set of ports of the first network switch includes a third MAC address that is also included in the first port of the set of ports of the second network switch; and
when the link is determined to exist, record existence of the link between the first port of the set of ports of the first network switch and the first port of the set of ports of the second network switch in a second computer-readable storage medium.

17. The non-transitory computer-readable storage medium of claim 16, further comprising instructions to construct the common set of MAC addresses comprising instructions to:
construct a first set of MAC addresses comprising each MAC address that is reachable by at least one port of the first network switch;
construct a second set of MAC addresses comprising each MAC address that is reachable by at least one port of the second network switch; and
construct the common set of MAC addresses as the union of the first set of MAC addresses and the second set of MAC addresses.

18. The non-transitory computer-readable storage medium of claim 17, further comprising instructions to remove, from the common set of MAC addresses, MAC addresses of the ports of the first network switch and MAC addresses of the ports of the second network switch.

19. The non-transitory computer-readable storage medium of claim 17, further comprising instructions to determine whether the common set of MAC addresses includes at least three elements before constructing the first set of ports and the second set of ports.

20. The non-transitory computer-readable storage medium of claim 16, wherein the instructions to determine that the link exists further comprise instructions to:
iterate through the set of ports of the second network switch to identify two ports of the set of ports of the second network switch that collectively include two MAC addresses that are also included by a port of the set of ports of the first network switch; and
determine that identified one of the two ports comprises the second port of the set of ports of the second network switch, that the identified other of the two ports comprises the third port of the set of ports of the second network switch, and that the identified port of the set of the ports of the first network switch comprises the first port of the set of ports of the first network switch.

21. The non-transitory computer-readable storage medium of claim 20, wherein the instructions to determine that the link exists further comprise instructions to:
iterate through the set of ports of the second network switch, excluding the second port and the third port of the set of ports of the second network switch, to identify a port of the set of ports of the second network switch that includes a MAC address that is also included by a port of the set of ports of the first network switch; and determine that the identified port of the set of ports of the second network switch comprises the first port of the second network switch and that the identified port of the set of ports of the first network switch comprises the second port of the first network switch.

22. The non-transitory computer-readable storage medium of claim 20, further comprising instructions to determine that a link does not exist between the first port of the set of ports of the first network switch and the first port of the set of ports of the second network switch when the first port includes a MAC address that is also included by the first port of the set of ports of the second network switch.

\* \* \* \* \*